(12) United States Patent
Tabacco

(10) Patent No.: US 11,265,362 B1
(45) Date of Patent: Mar. 1, 2022

(54) MOBILE APPLICATION STREAMING PLATFORM

(71) Applicant: Ted Tabacco, San Francisco, CA (US)

(72) Inventor: Ted Tabacco, San Francisco, CA (US)

( * ) Notice: Subject to any disclaimer, the term of this patent is extended or adjusted under 35 U.S.C. 154(b) by 311 days.

(21) Appl. No.: 15/393,101

(22) Filed: Dec. 28, 2016

Related U.S. Application Data

(60) Provisional application No. 62/271,922, filed on Dec. 28, 2015.

(51) Int. Cl.
*G06F 16/182* (2019.01)
*H04L 67/025* (2022.01)
*H04L 67/53* (2022.01)
*H04L 67/303* (2022.01)

(52) U.S. Cl.
CPC ............ *H04L 67/025* (2013.01); *H04L 67/20* (2013.01); *H04L 67/303* (2013.01)

(58) Field of Classification Search
CPC ...... H04L 67/025; H04L 67/20; H04L 67/303
See application file for complete search history.

(56) References Cited

U.S. PATENT DOCUMENTS

| | | | | |
|---|---|---|---|---|
| 8,219,653 B1 * | 7/2012 | Keagy | ....................... | G06F 8/63 709/222 |
| 8,712,968 B1 * | 4/2014 | Chester | ............... | G06F 11/1417 707/649 |
| 9,547,345 B2 * | 1/2017 | Brown | ....................... | G06F 1/24 |
| 2003/0195995 A1 * | 10/2003 | Tabbara | ................ | G06F 9/4416 719/313 |
| 2007/0171921 A1 * | 7/2007 | Wookey | ................ | G06F 3/1415 370/401 |
| 2009/0043840 A1 * | 2/2009 | Cherukuri | ............... | H04L 41/00 709/203 |
| 2011/0314093 A1 * | 12/2011 | Sheu | ....................... | G06F 9/4445 709/203 |
| 2013/0013727 A1 * | 1/2013 | Walker | ..................... | G06F 9/468 709/217 |
| 2014/0019546 A1 * | 1/2014 | Narasimha | ............ | H04L 67/306 709/204 |
| 2014/0053261 A1 * | 2/2014 | Gupta | ..................... | G06F 21/55 726/22 |
| 2014/0304326 A1 * | 10/2014 | Wesley | ................... | H04L 67/10 709/203 |
| 2014/0359518 A1 * | 12/2014 | Wu | ........................ | G06F 3/0481 715/779 |
| 2015/0081764 A1 * | 3/2015 | Zhao | ....................... | H04L 67/08 709/203 |
| 2019/0268771 A1 * | 8/2019 | Seo | ........................ | G06F 3/0346 |

OTHER PUBLICATIONS

VMware Server User's Guide, VMware Server 2.0, pp. 7-9, (First version of the documentation—Aug. 28, 2008).*

* cited by examiner

*Primary Examiner* — Chris Parry
*Assistant Examiner* — Dixon F Dabipi
(74) *Attorney, Agent, or Firm* — Clayton Howarth, P.C.

(57) ABSTRACT

The disclosed virtual mobile desktop platform includes a native mobile desktop client application and a remote mobile desktop customized for a specific user, wherein the user can select or unselect specific applications from a list of pre-installed applications based on user preference. The native mobile desktop client application may be accessible via the remote mobile desktop, and the native mobile desktop application can retain the state of the application when the user last logged off and resumes from the same point when the user logs in the next time.

19 Claims, 9 Drawing Sheets

MOBILE APPLICATION STREAMING PLATFORM

CROSS-REFERENCE TO RELATED APPLICATIONS

This application claims the benefit of U.S. Provisional Application No. 62/271,922, filed Dec. 28, 2015, which is hereby incorporated by reference in its entirety, including but not limited to those portions that specifically appear hereinafter, the incorporation by reference being made with the following exception: In the event that any portion of the above-referenced application is inconsistent with this application, this application supercedes the above-referenced application.

STATEMENT REGARDING FEDERALLY SPONSORED RESEARCH OR DEVELOPMENT

Not Applicable.

BACKGROUND

1. The Field of the Present Disclosure

The present disclosure relates generally to systems providing a unified consumer application that can include multiple disparate mobile applications and, more particularly, but not necessarily entirely, to systems, platforms, and methods for providing such a unified consumer application.

2. Description of Related Art

The importance and role of mobile devices and mobile technology in the electronic technology space has grown significantly since the turn of the century. One of the most significant areas of growth in the electronic technology space has come from the use of mobile applications. Consumers are leveraging more mobile applications than ever before and businesses are making increasingly significant investments in their own mobile applications to meet consumer preferences. The business context for this solution relates to the challenge faced by owners of mobile applications in getting consumers to adopt their respective applications. Due to the constraints of the conventional method of downloading mobile applications to the hard drive of the mobile device, consumers are left with a limited choice as to what mobile applications they can leverage at any given moment.

The problem that the disclosed platform is trying to address is how to provide the consumer a "unified" application that will be a one stop shop to enable the consumer to engage with mobile applications that are not relevant or used frequently enough to justify the necessary space on the consumer's mobile device.

The prior art is thus characterized by several disadvantages that are addressed by the present disclosure. The present disclosure minimizes, and in some aspects eliminates, the above-mentioned failures and other problems by utilizing the methods and structural features described herein.

The features and advantages of the present disclosure will be set forth in the description that follows and, in part, will be apparent from the description or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
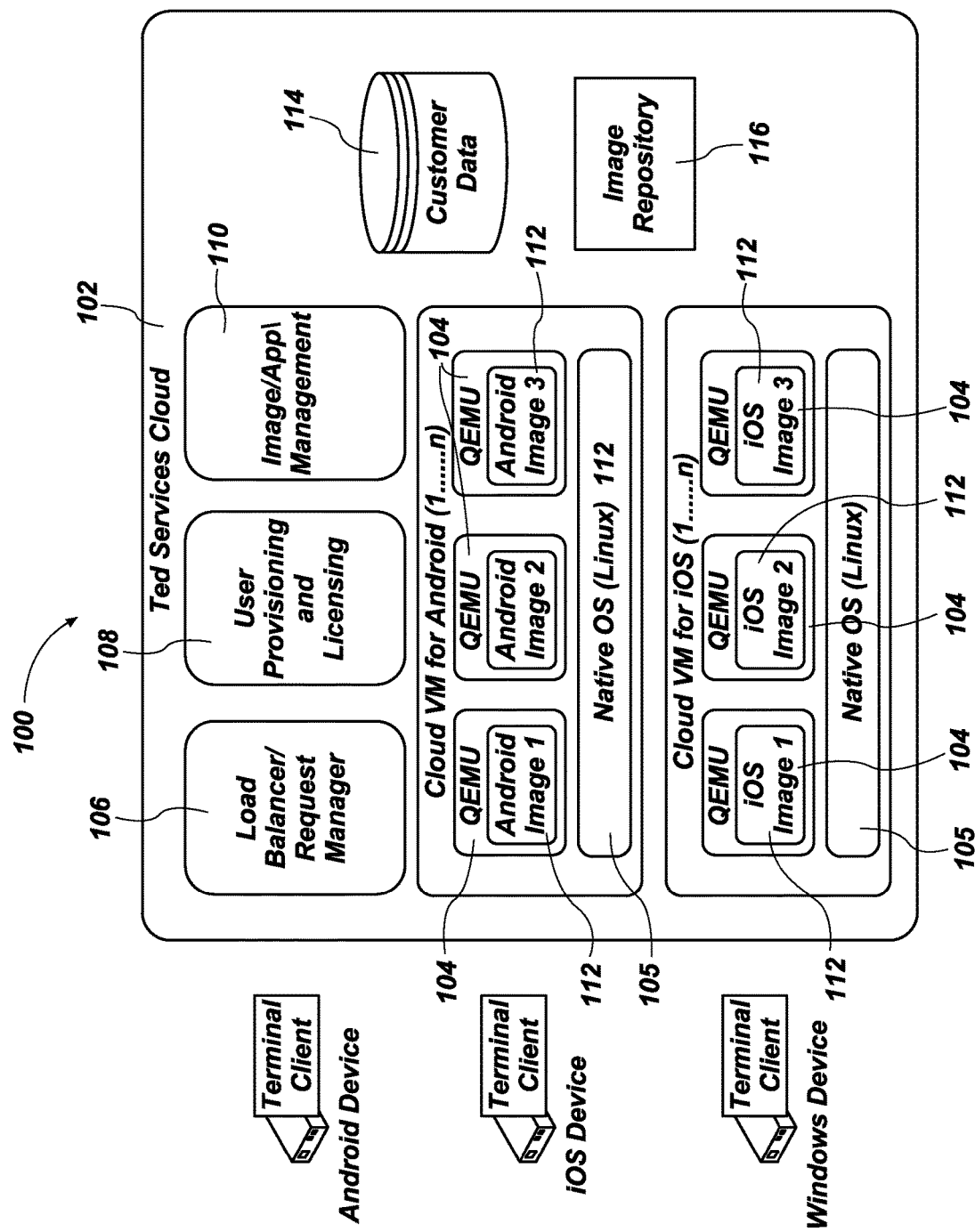
FIG. 1 is a schematic diagram of a virtual mobile platform according to an illustrative embodiment of the present disclosure.

For the purposes of promoting an understanding of the principles in accordance with the disclosure, reference will now be made to the embodiments illustrated in the drawings and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "having," "characterized by," and grammatical equivalents thereof are inclusive or open-ended terms that do not exclude additional, unrecited elements or method steps.

The disclosed invention provides a "virtual mobile desktop" that can internally host a variety of different applications. The virtual mobile desktop can be accessed via a client application that runs on a consumer's mobile device or other selected device. This enables the streaming of a mobile device application from a remote or cloud environment into a native application being run by the mobile device. The consumer merely needs to install the virtual mobile desktop or mobile application on the selected device, and then the user is enabled ready access to a multitude of different individual applications that can be streamed from the remote or cloud environment.

Embodiments of the present invention also include a server, memory, processor, and a computer-readable medium containing a set of instructions or program(s) causing the computer system or virtual mobile desktop platform to facilitate and function according to the present invention. For example, an embodiment of the disclosed virtual mobile desktop can include: a native mobile desktop client application, with iOS, Android, and Windows specific applications (or other selected application platforms) that needs to be installed; and a remote "Mobile Desktop" that can be customized for each user. The users can create a unique identification in the system, which can be used to create the customized desktop environment for each specific individual user. Users can opt to sign into the virtual mobile desktop with their social media identification utilizing a single sign-on solution, thus increasing the simplicity and ease of use of the virtual mobile desktop.

Application vendors can have their applications pre-installed on the virtual mobile desktop, creating an incentive for the vendors to partner with the virtual mobile desktop provider. The user can select or unselect specific applications from a list of pre-installed applications based on user preference and choose to sign-in to individual applications using their own separate login, or via the virtual remote desktop id/social media identification. Thus, a user can stream the selected application or virtual desktop from a remote or cloud environment into a native application being run by the user's mobile device.

The virtual mobile desktop can also support most of the device specific features of desired applications including, for example, gesture controls, accelerometer inputs, etc. An embodiment of the virtual mobile desktop can also facilitate a user session that can be a "sticky" session, i.e. the virtual mobile desktop can "remember" the state of the desktop or application when the user last logged off and can resume from the same point when the user logs-in the next time.

As illustrated in the schematic diagram shown in FIG. 1, the disclosed virtual mobile desktop can include a mobile application virtualization platform 100. The platform 100 architecture can include a Linux-based Platform as a Service, or PaaS, cloud 102 that can operate hardware emulators 104 for mobile operating systems using Quick Emulator (QEMU), which is a generic and open source emulator and virtualizer, or other existing technology. The cloud 102 can also include multiple instances of emulators per Linux virtual machine (VM) 105, and load balancing 106, which can enable "platform on demand" as well as user provisioning 108 and licensing and image/application management 110 operators. The cloud 102 can facilitate the emulation of a mobile device operating system (such as a mobile phone).

The cloud 102 can also include customized IOS and/or Android images 112 running on the QEMU 104. The cloud 102 can also enable separate customer/user configuration and data 114 about applications that have been subscribed to by the customer. The platform 100 also enables on-the-fly image spin up by cross referencing base images 116, application installed data, and unique customer data.

Figure 2:
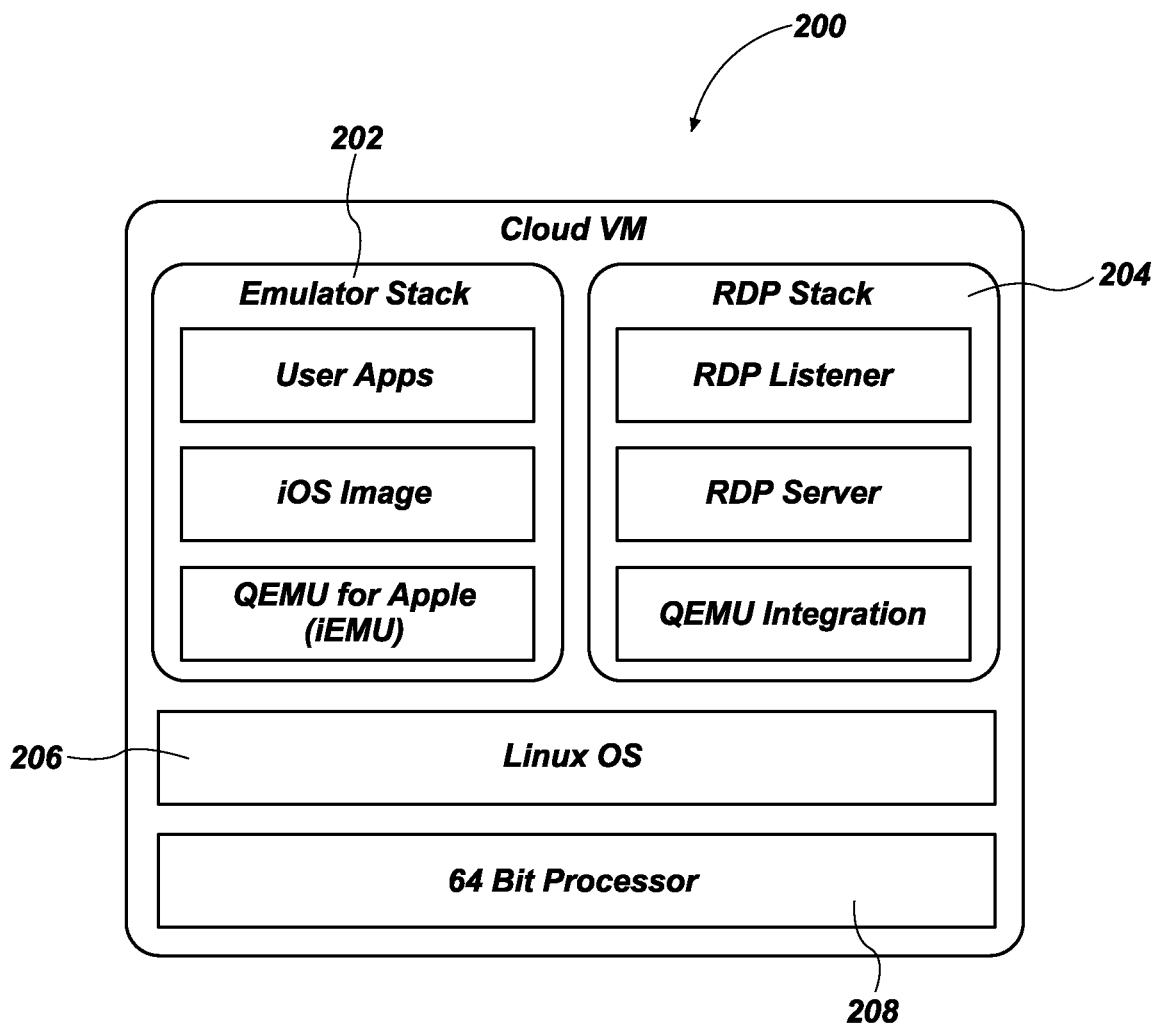
FIG. 2 is a schematic diagram of cloud compatible with the virtual mobile platform according to an illustrative embodiment of the present disclosure.

As shown in the schematic diagram of FIG. 2, another embodiment of the present disclosure includes a VM cloud 200 composed of a Linux-based cloud 206 that would have emulator instances 202 installed. The cloud 200 can allow a provider to scale based on user demand. The Linux operating system 206 can be facilitated and utilized with a 64 bit processor 208, although an alternative processor could be used depending on desired speed and necessary demand utilization.

The cloud 200 can also include a hardware emulator to run the mobile OS images and user applications. Open source emulators could be utilized to be able to redirect audio, visual and haptic feedback to and from a Remote Desktop Protocol, or RDP service, 204 and also to expose Application Programming Interfaces, or APIs, to get context information, for example, by using a QEMU.

Customized QEMU or similar tools can be used to emulate different platforms, such as iPad, iPhone, etc. In terms of Android, a reference platform can be created that will support most of the Android functionalities. The QEMU could be customized to support iOS or to create another emulator that can be manufactured from scratch.

Figure 3:
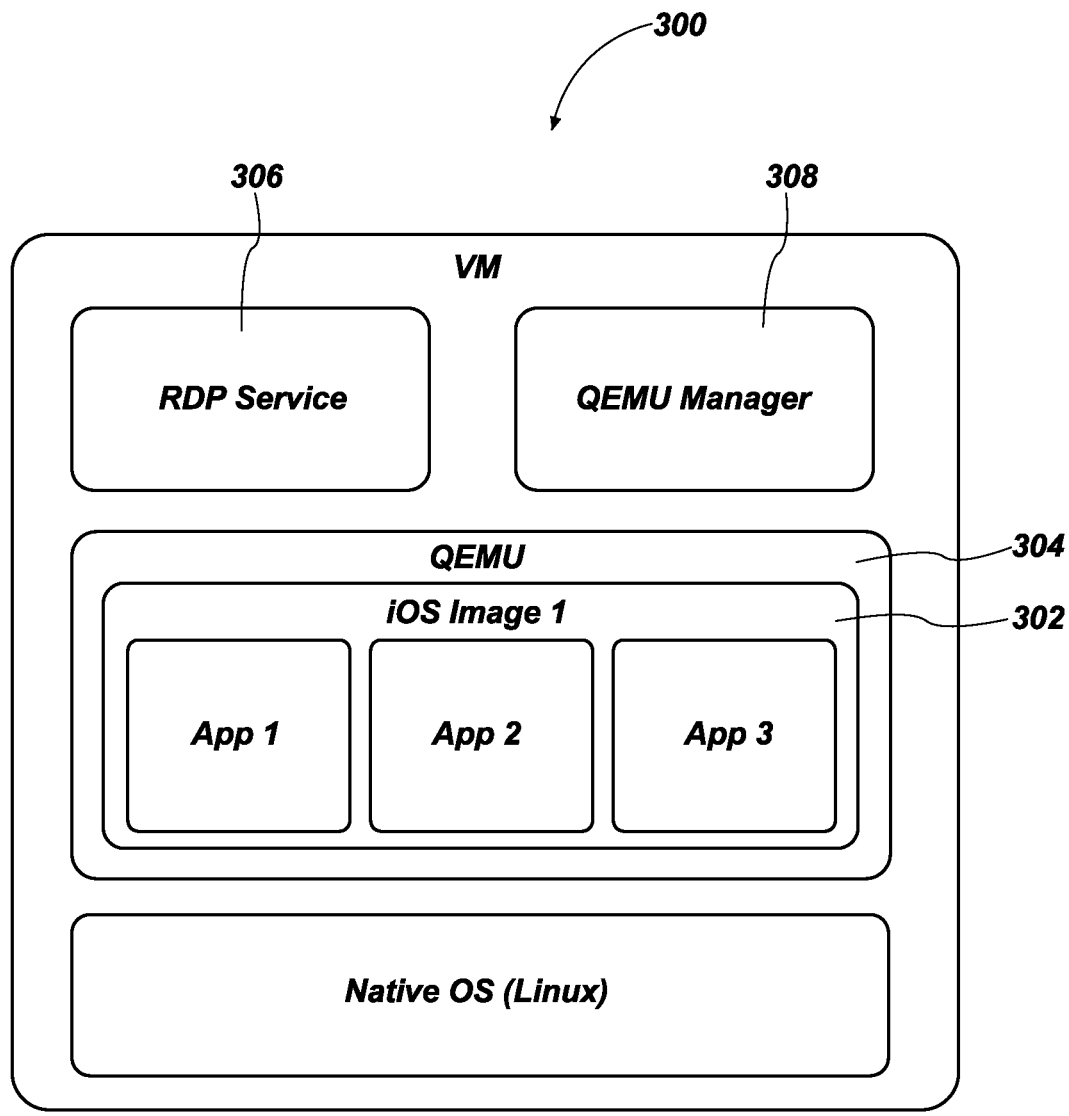
FIG. 3 is a schematic diagram of a virtual machine compatible with the virtual mobile platform according to an illustrative embodiment of the present disclosure.

As shown in the schematic diagram of FIG. 3, a cloud VM 300 can include an iOS/Android image 302 that could readily run on a QEMU 304 or other emulator. The QEMU 304 or other hardware emulator could also be used to allow the core iOS/Android image 302, including various desired applications, to run. An RDP service program 306 can maintain connection with different clients at the same time and get data to and from the emulator manager 308. Using the RDP service can enable sending device sensor data over the RDP 306 to a server and enable haptic feedback from the server to the client over the RDP 306.

Other components of the disclosed virtual mobile desktop include: a load balancer, which can evaluate how each VM (Linux VM) is loaded in terms of number of QEMUs running, CPU/memory utilization, etc., and redirect new client sessions to appropriate servers. Any of the open source, feedback loop based fair share load balancing algorithms can be used in this capacity. Alternatively, if the cloud provider allows elastic scaling of VM counts based on load, then load balancing need not be implemented for this solution.

A user/license management operator is another component utilized for resolving user credentials, evaluates what the user has signed up for which OS's, which apps, etc., and build the user configuration.

An image manager can also be utilized once the user context is loaded, and an OS image can be created on demand, with the pre-existing images from the repository, application install data and/or application-user data.

Another feature of the disclosed virtual mobile desktop is the client application. The client application can enable a user to access the virtual mobile desktop. The interaction between the client application and the virtual mobile desktop enables the streaming of the client or mobile application from a remote or cloud environment into the native application that has been integrated with the user's mobile device.

Figure 4:
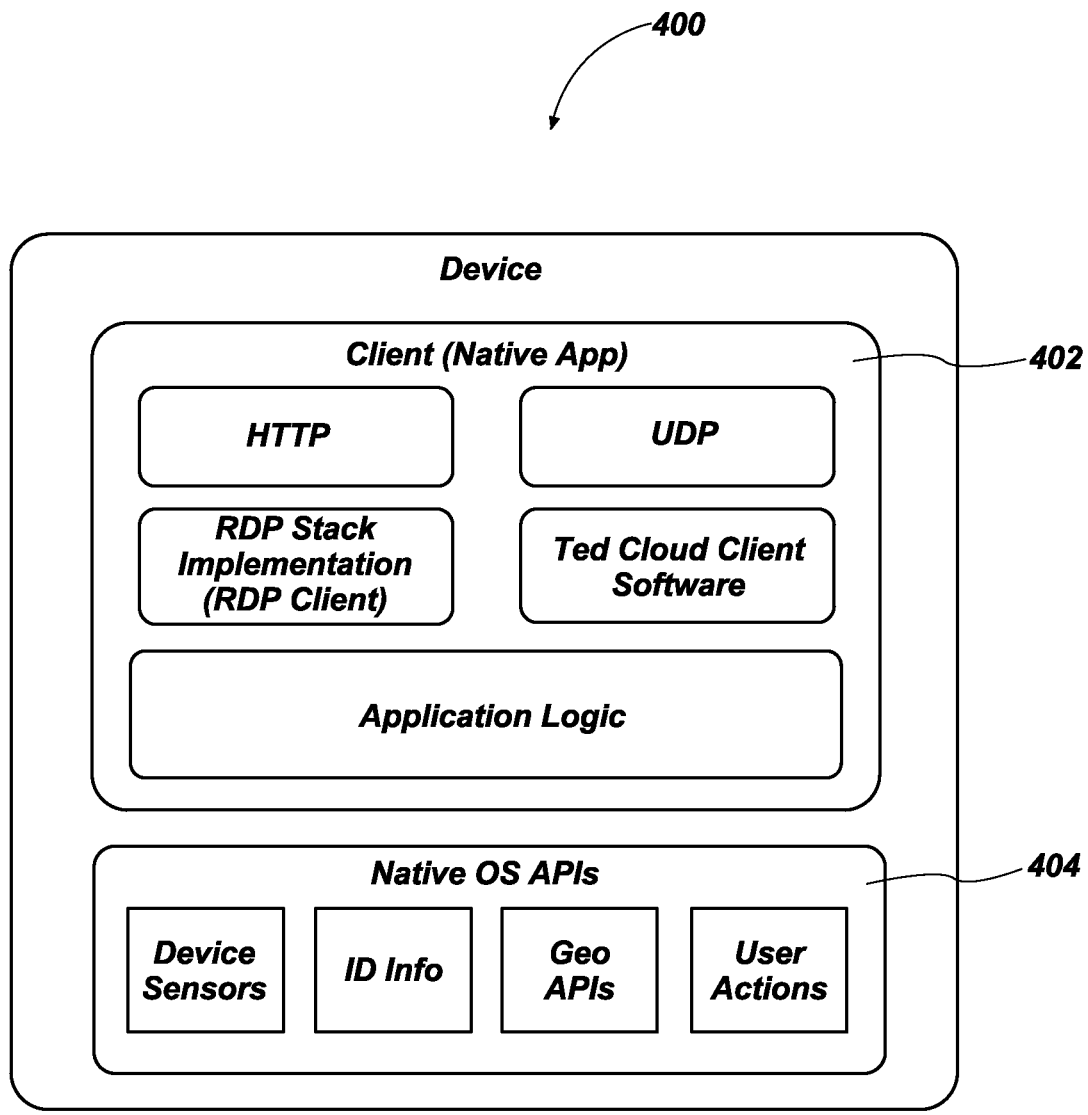
FIG. 4 is a schematic diagram of a client application according to an illustrative embodiment of the present disclosure.

As shown in the schematic of FIG. 4, the client application 400 can include a native application 402 that can be coded separately for iOS, Android, and Windows phones or mobile devices and can access the mobile OS APIs 404 to get user inputs and sensor inputs. The client application 400 can also be certified and made available via, for example, the Apple Store and Google Play. The client application 400 can receive the desktop stream and audio from the remote server and render on the mobile device. The client application 400 can also receive haptic feedback data from the remote desktop and pass it on to the native OS 404.

Support connection can be made over http or UDP, but would be more lightweight in terms of server resources. In addition, the client application 400 can also have the logic to authenticate the user, initial handshake, licensing, and other information, before doing a hand-off to the RDP. The client application can also support login using a Ted-Cloud specific user id or social media user id that the user chooses to share.

Figure 5:
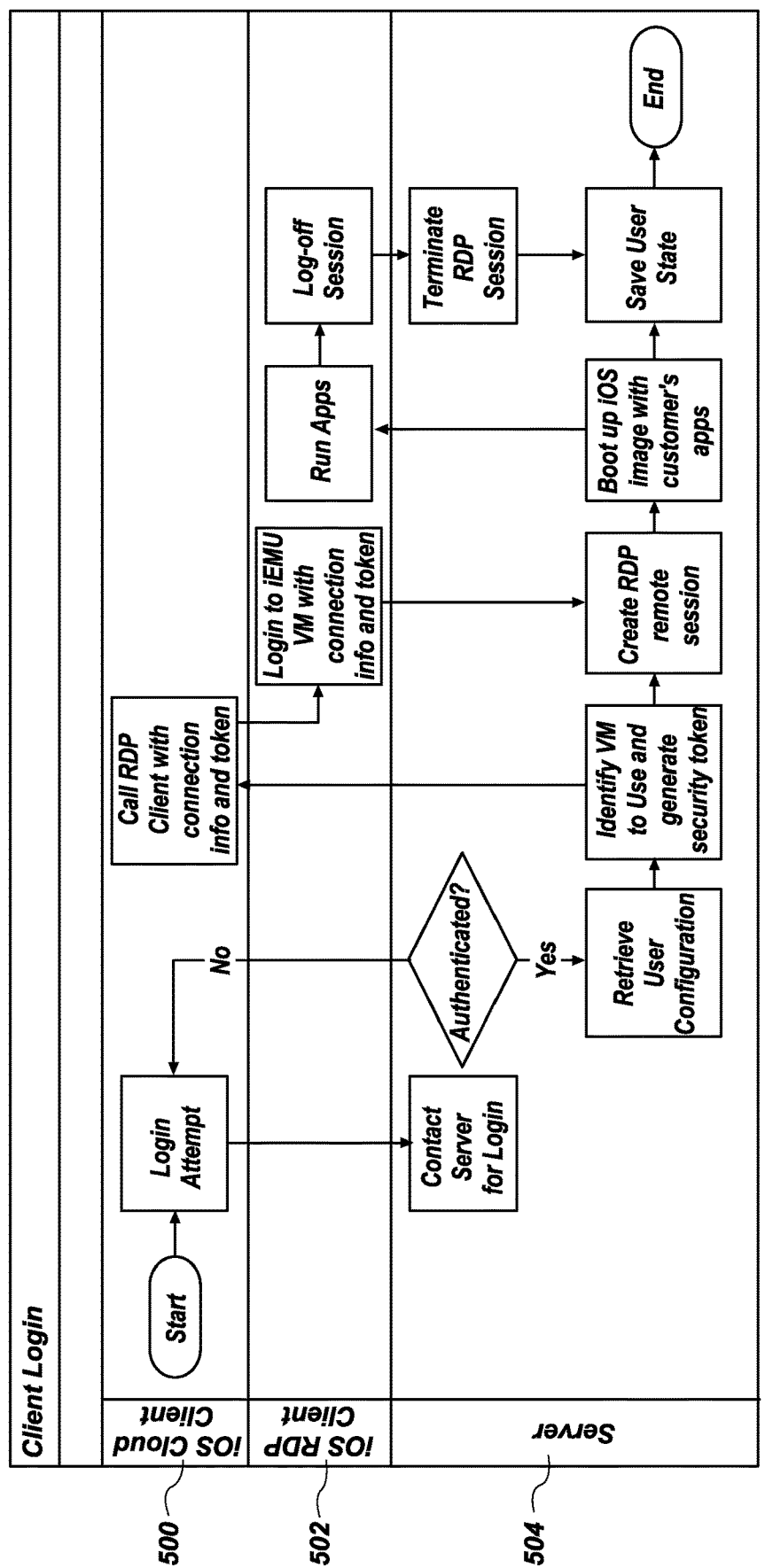
FIG. 5 illustrates an end-to-end flow diagram of a client login according to an illustrative embodiment of the present disclosure.

FIG. 5 illustrates a step-by-step process of a client user logging into the client application and running desired applications. The login process utilizes a cloud client 500, a RDP Client 502, and a specialized server 504, which is configured specifically to performed the desired functions. To begin the login process, a login attempt is made on the cloud client 500, which then contacts the server 504. The server 504 must then authenticate the login and, when the login is authenticated, the server can retrieve the user configuration, which identifies which VM to use and generates a security token. The server 504 then calls the RDP client 502 using connection information and the security token. The RDP client 502 can then login to the iEMU VM with the connection information and the security token, which enables the server 504 to create a RDP remote session and boot up an OS image with the user or customer's applications.

Figure 6:
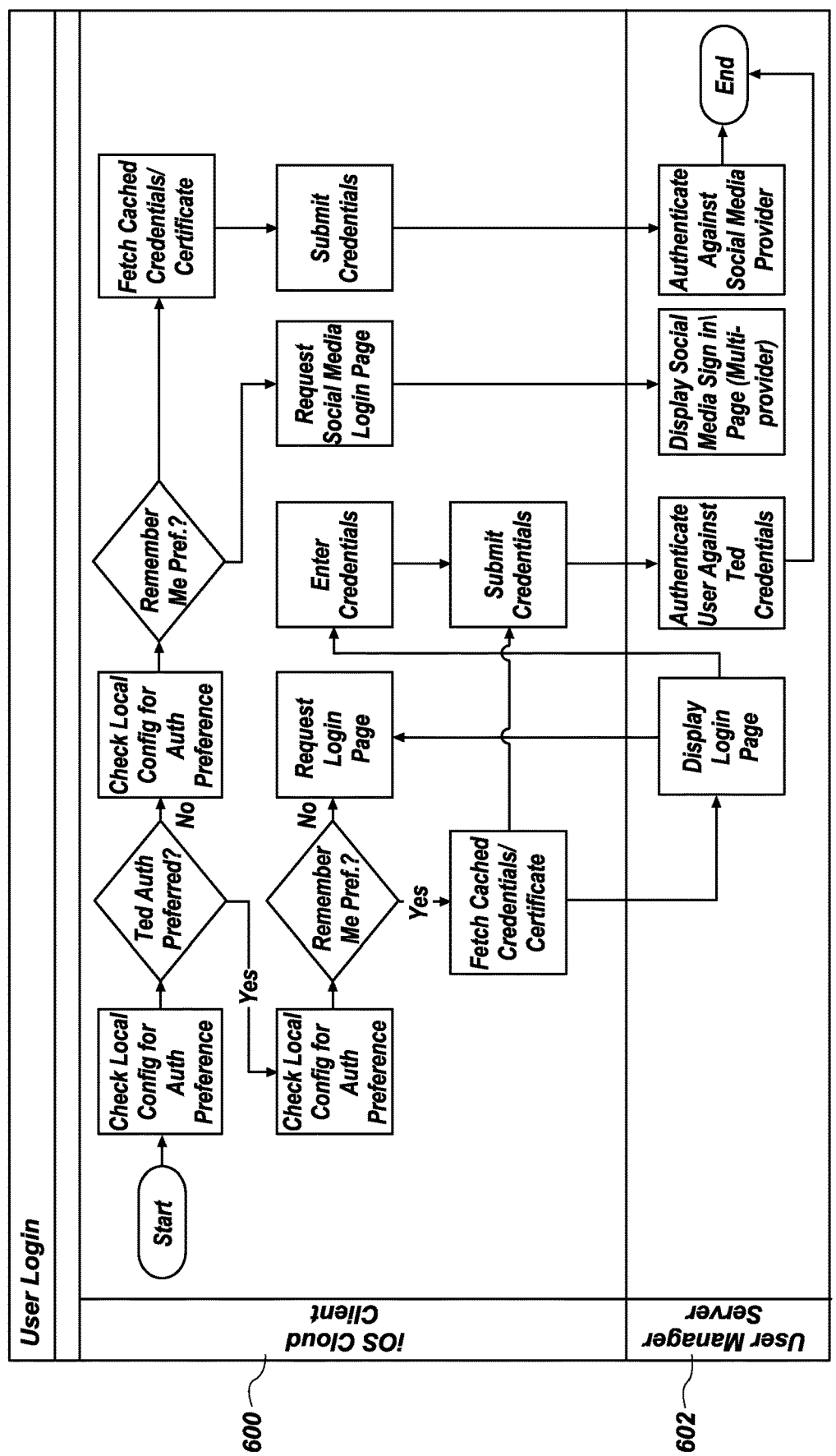
FIG. 6 illustrates an end-to-end flow diagram of a user login according to an illustrative embodiment of the present disclosure.

FIG. 6 illustrates a step-by-step process for a user login procedure used with the disclosed virtual mobile desktop embodiments disclosed herein. The user login procedure also utilizes a cloud client 600 that communicates with a user manager server 602 to enable the user login.

Figure 7:
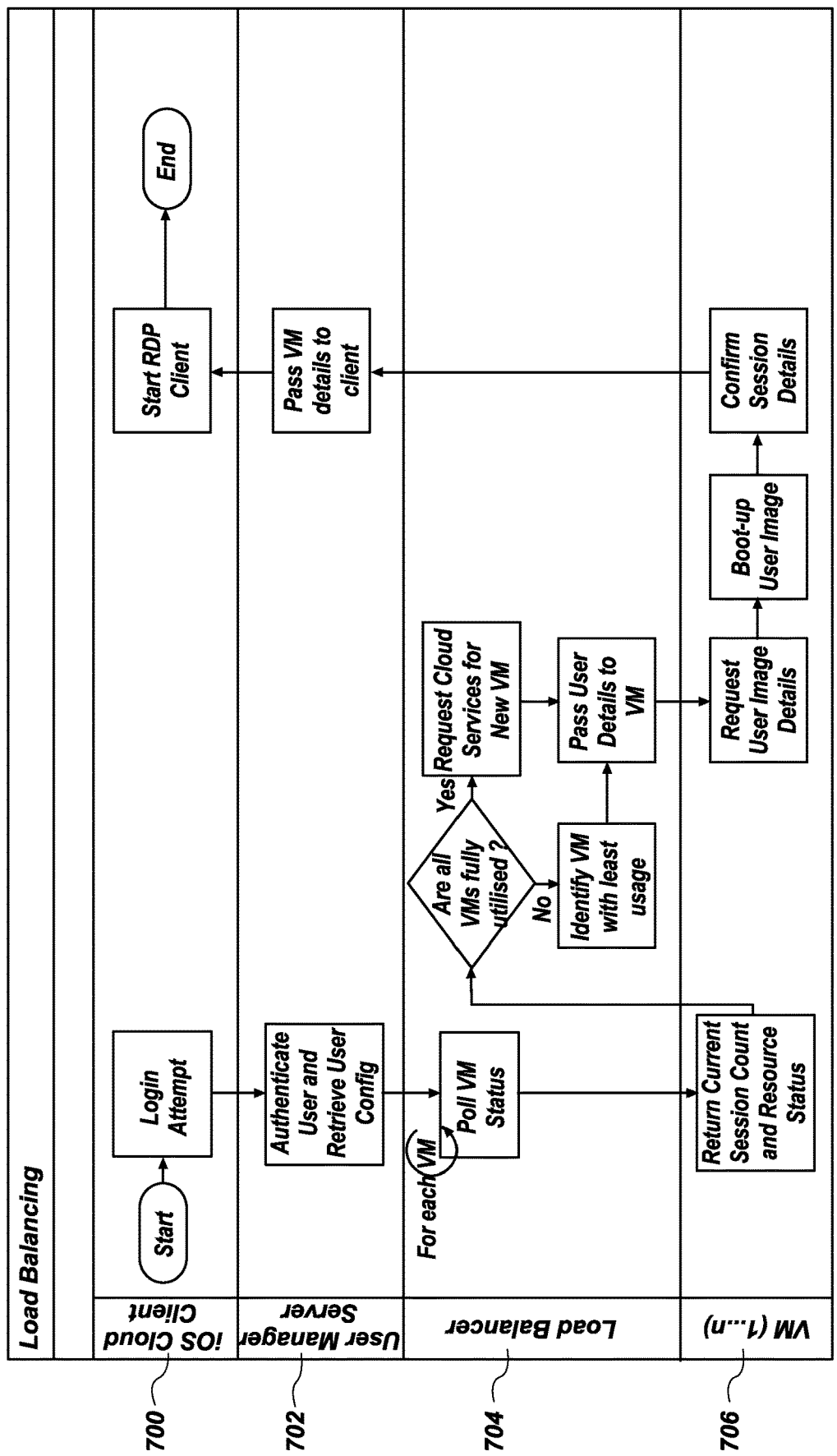
FIG. 7 illustrates an end-to-end flow diagram of a load balancing procedure according to an illustrative embodiment of the present disclosure.

FIG. 7 illustrates step-by-step processes for a load balancing procedure used with the disclosed virtual mobile desktop embodiments disclosed herein. The load balancing procedure utilizes a cloud client 700, a user management server 702, a load balancer 704, and a VM 706.

Figure 8:
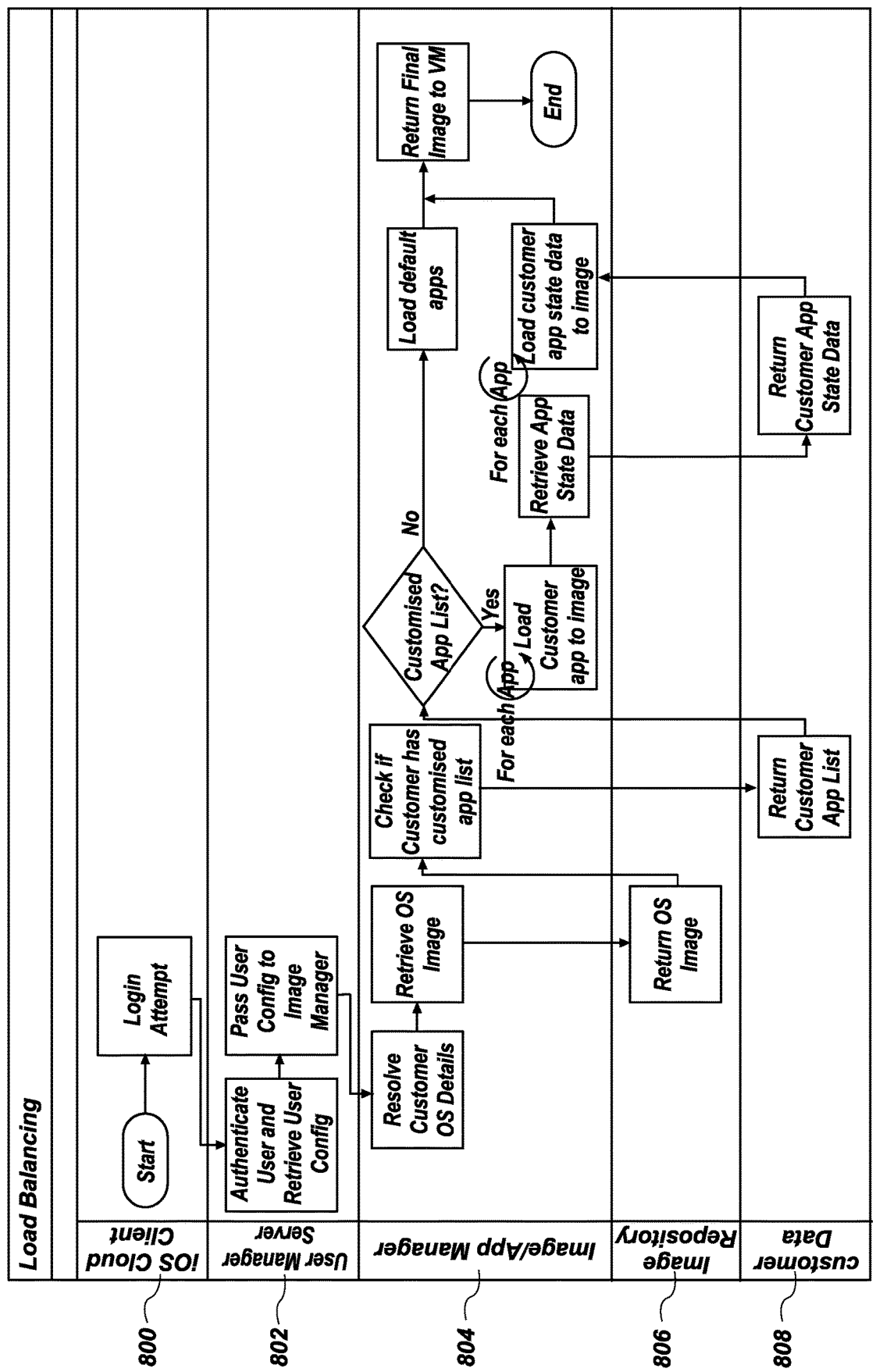
FIG. 8 illustrates an end-to-end flow diagram of an image creation procedure according to an illustrative embodiment of the present disclosure.

FIG. 8 illustrates a step-by-step process for image creation using the disclosed virtual mobile desktop embodiments disclosed herein. The image correction procedure utilizes a cloud client 800, a user management server 802, an application manager 804, an image repository 806, and customer data files 808.

Figure 9:
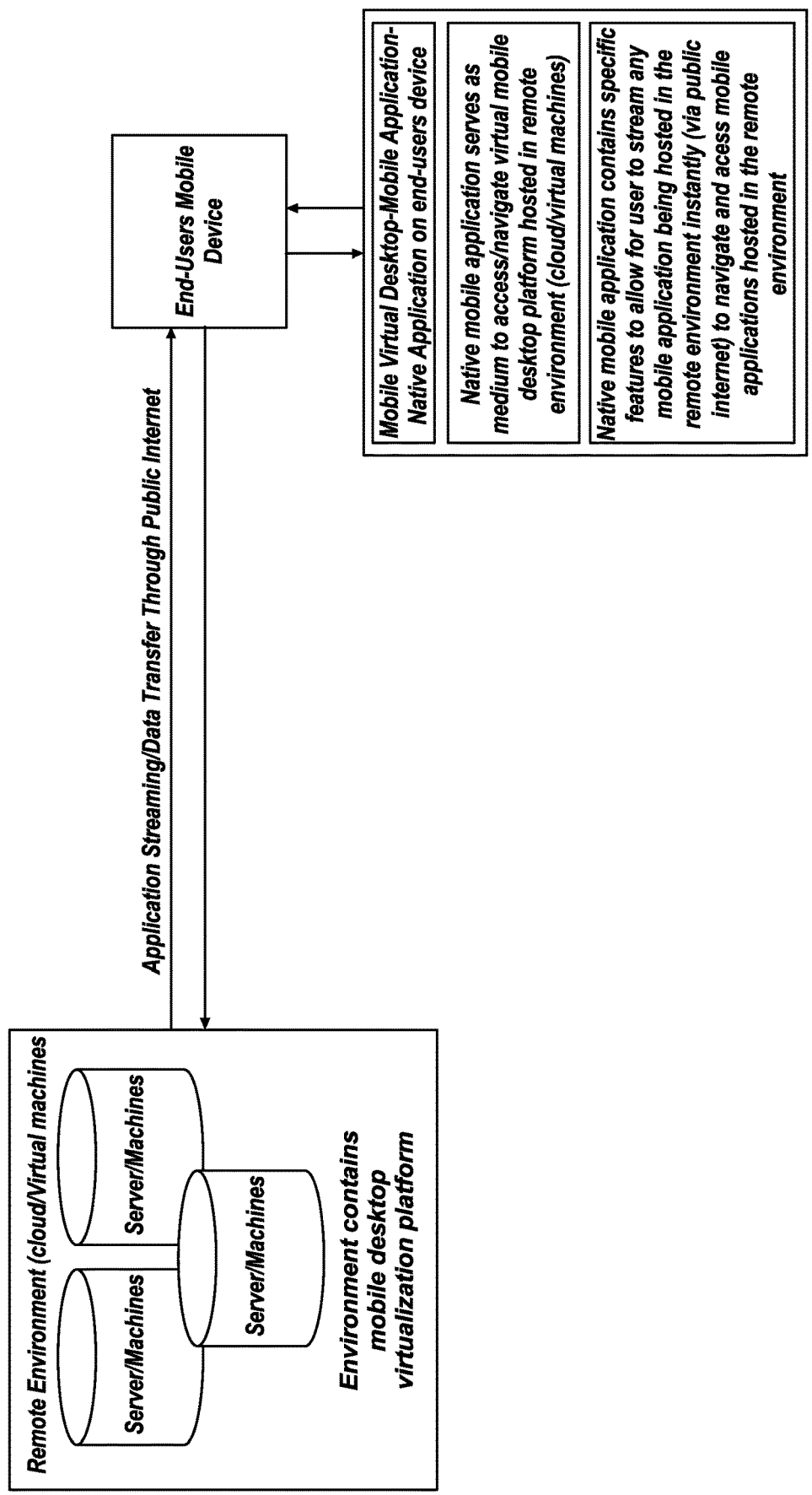
FIG. 9 is a schematic illustration of the application streaming through an internet connection.

FIG. 9 illustrates a schematic of an application streaming through an internet connection. The schematic illustrates an overall system summary of the interaction and configuration between the remote cloud environment and a user's mobile device when streaming an application through an internet connection.

In the drawings and specification, there has been disclosed a typical embodiment of the invention, and, although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly, and use may be made without departing from the principles and concepts set forth herein.

The invention claimed is:

1. A system comprising a virtual mobile desktop platform, the system comprising:
   one or more mobile devices configured to run a native mobile desktop application and allowing one or more users to log in to a specific profile;
   a remote mobile desktop customized for a specific user wherein the user can select or unselect specific applications from a list of pre-installed applications on the remote mobile desktop based on user preference;
   wherein the remote mobile desktop is generated upon the user of the native desktop client application running the native mobile desktop client application;
   wherein the remote mobile desktop is generated on a cloud located on a remote device accessible to the native mobile desktop client application;
   wherein the cloud comprises a mobile application virtualization platform, comprised of one or more virtual machines, a load balancing system, user provisioning and licensing systems, and an image management system;
   wherein the one or more virtual machines are each designated to work with a specific mobile operating system and wherein each virtual machine runs one or more emulators, each of the one or more emulators running a custom image of a mobile operating system;
   wherein the load balancer evaluates each demand for a remote mobile desktop and how each virtual machine is loaded and directs new sessions to appropriate servers;
   wherein the user provisioning and licensing system evaluates each demand to generate a remote mobile desktop and builds a user configuration based upon which operating system a user has signed up for, which applications a user has signed up for, and other information that applies to a specific user;
   wherein the cloud also stores user-specific data related to each specific profile, including application install data, application user data, and user-specific preferences;
   wherein the image management system comprises an image repository that stores pre-existing operating system images;
   wherein the image management system also comprises an image manager that creates each custom image of a mobile operating system upon demand by using the pre-existing operating system images from the image repository, application install data, user configuration, and application user data;
   wherein the remote mobile desktop and native mobile desktop client application can be used to run applications not available on a user's mobile device and stream application data to the user's mobile device;
   wherein the native mobile desktop client application communicates input from device specific features including gesture controls and accelerometer inputs to the virtual mobile desktop when needed by the application running on the remote mobile desktop;

wherein the native mobile desktop application retains the state of the application when the user last logged off and resumes from the same point when the user logs in the next time; and wherein the cloud also enables separate customer/user configuration and data about the specific applications from the list of pre-installed applications available on the remote mobile desktop via the native mobile desktop that have been subscribed to by the customer.

2. The platform of claim 1, wherein the remote mobile desktop enables and supports device specific features including gesture controls and accelerometer inputs.

3. The platform of claim 1, wherein the mobile desktop includes a unique identification in the system, which can be used to create a customized desktop environment for the user.

4. The platform of claim 1, wherein at least one vendor application is pre-installed on the virtual mobile desktop.

5. The platform of claim 1, wherein the remote mobile desktop is accessible by the user by signing into individual applications using the user's own separate login, or via the virtual remote desktop id/social media identification.

6. A system comprising a virtual mobile desktop platform, the system comprising:
  a mobile electronic device comprising a native mobile application;
  a remote cloud environment, wherein a mobile application is streamed into the native mobile application via the remote cloud environment, and wherein the user can select or unselect specific applications from a list of pre-installed applications on the remote cloud environment based on user preference;
  a mobile application virtualization platform, facilitating an emulation of mobile device operating systems in the remote cloud environment;
  wherein the mobile application virtualization platform comprises one or more virtual machines, a load balancing system, user provisioning and licensing systems, and an image management system;
  wherein the one or more virtual machines are each designated to work with a specific mobile operating system and wherein each virtual machine runs one or more emulators, each of the one or more emulators running a custom image of a mobile operating system;
  wherein the load balancer evaluates each demand for a remote mobile desktop and how each virtual machine is loaded and directs new sessions to appropriate servers;
  wherein the user provisioning and licensing system evaluates each demand to emulate a mobile device operating system and builds a user configuration based upon which operating system a user has signed up for, which application a user wishes to access, and other information that applies to a specific user;
  wherein the cloud also stores user-specific data related to each specific user, including application install data, application user data, and user-specific preferences;
  wherein the image management system comprises an image repository that stores pre-existing operating system images;
  wherein the image management system also comprises an image manager that creates each custom image of a mobile operating system upon demand by using the pre-existing operating system images from the image repository, application install data, user configuration, and application user data;
  wherein the native mobile desktop client application communicates input from device specific features including gesture controls and accelerometer inputs to the virtual mobile desktop when needed by the application running on the remote mobile desktop; and
  wherein the cloud also enables separate customer/user configuration and data about the specific applications from the list of pre-installed applications on the remote cloud environment that is streamed into the native mobile application and that have been subscribed to by the customer.

7. The platform of claim 6, wherein the remote cloud environment is customized for a specific user, wherein the user can select or unselect specific applications from a list of preinstalled applications based on user preference.

8. The platform of claim 7, wherein the native mobile application retains a state of the application when a user last logged off and resumes from the same point when the user logs in the next time.

9. The platform of claim 6, wherein the remote cloud environment enables and supports mobile electronic device specific features including gesture controls and accelerometer inputs.

10. The platform of claim 6, wherein the remote cloud environment includes a unique identification in the system, which can be used to create a customized desktop environment for the user.

11. The platform of claim 6, wherein at least one vendor application is pre-installed on the virtual mobile desktop.

12. The platform of claim 6, wherein the remote cloud environment is accessible by the user by signing into individual applications using the user's own separate login.

13. A computer system facilitating a virtual mobile desktop platform comprising:
  a server;
  a processor;
  a native mobile application integrated onto a mobile electronic device;
  a remote cloud environment wherein the user can select or unselect specific applications from a list of pre-installed applications on the remote cloud environment based on user preference;
  a non-transitory, computer readable medium having a computer program enabling the computer system to stream a mobile device application into the native mobile application via the remote cloud environment;
  a mobile application virtualization platform, facilitating an emulation of mobile device operating systems in the remote cloud environment;
  wherein the mobile application virtualization platform comprises one or more virtual machines, a load balancing system, user provisioning and licensing systems, and an image management system;
  wherein the one or more virtual machines are each designated to work with a specific mobile operating system and wherein each virtual machine runs one or more emulators, each of the one or more emulators running a custom image of a mobile operating system;
  wherein the load balancer evaluates each demand for a remote mobile desktop and how each virtual machine is loaded and directs new sessions to appropriate servers;
  wherein the user provisioning and licensing system evaluates each demand to generate a remote mobile desktop and builds a user configuration based upon which operating system a user has signed up for, which applications a user has signed up for, and other information that applies to a specific user;

wherein the cloud also stores user-specific data related to each specific profile, including application install data, application user data, and user-specific preferences;

wherein the image management system comprises an image repository that stores pre-existing operating system images;

wherein the image management system also comprises an image manager that creates each custom image of a mobile operating system upon demand by using the pre-existing operating system images from the image repository, application install data, user configuration, and application user data;

wherein the remote cloud environment receives input from device specific features including gesture controls and accelerometer inputs when needed by the application running in the remote cloud environment; and wherein the cloud also enables separate customer/user configuration and data about the specific applications from the list of pre-installed applications on the remote cloud environment that is streamed into the native mobile application and that have been subscribed to by the customer.

14. The platform of claim 13, wherein the remote cloud environment is customized for a specific user, wherein the user can select or unselect specific applications from a list of preinstalled applications based on user preference.

15. The platform of claim 14, wherein the native mobile application retains a state of the application when a user last logged off and resumes from the same point when the user logs in the next time.

16. The platform of claim 13, wherein the remote cloud environment enables and supports mobile electronic device specific features including gesture controls and accelerometer inputs.

17. The platform of claim 13, wherein the remote cloud environment includes a unique identification in the system, which can be used to create a customized desktop environment for the user.

18. The platform of claim 13, wherein at least one vendor application is pre-installed on the virtual mobile desktop.

19. The platform of claim 13, wherein the remote cloud environment is accessible by the user by signing into individual applications using the user's own separate login.

* * * * *